(No Model.)
E. H. B. BROW.
BICYCLE LOCK.
No. 583,728.  Patented June 1, 1897.
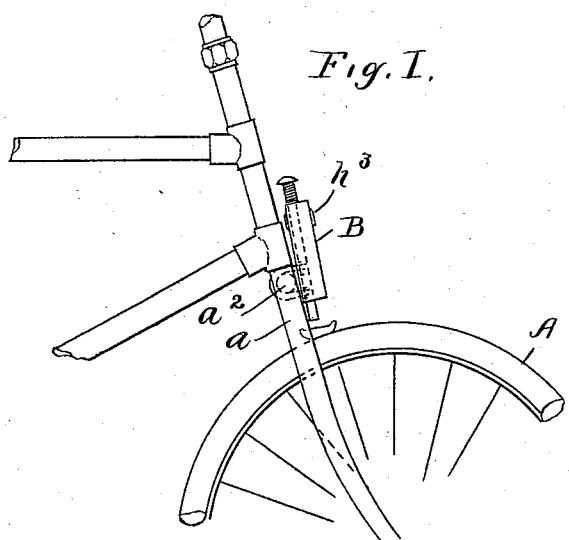
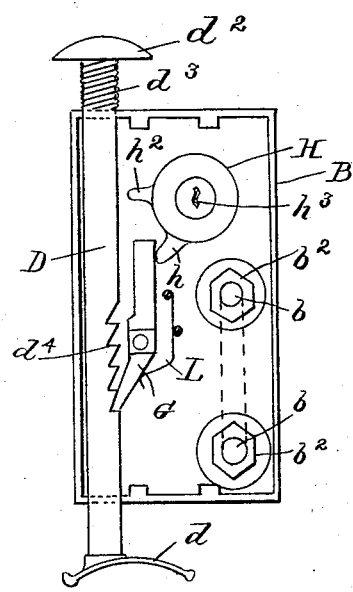
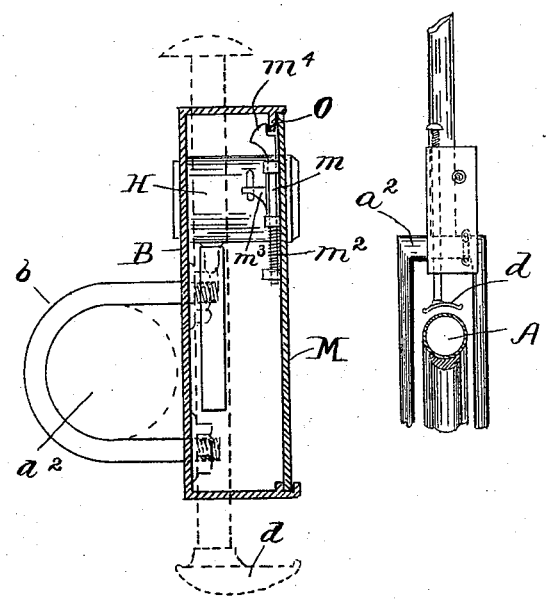
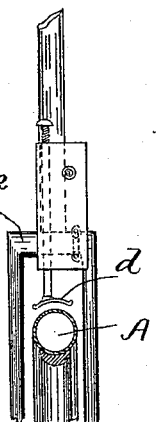
WITNESSES:
Chas. G. Wagner
C. Gerst
INVENTOR
Edward H. B. Brow
BY
Edgar Tate Leo
ATTORNEYS

UNITED STATES PATENT OFFICE.

EDWARD H. B. BROW, OF FALL RIVER, MASSACHUSETTS.

BICYCLE-LOCK.

SPECIFICATION forming part of Letters Patent No. 583,728, dated June 1, 1897.

Application filed February 15, 1896. Serial No. 579,341. (No model.)

*To all whom it may concern:*

Be it known that I, EDWARD H. B. BROW, a citizen of the United States, and a resident of Fall River, in the county of Bristol and State of Massachusetts, have invented certain new and useful Improvements in Locks for Bicycles and Similar Vehicles, of which the following is a specification, reference being had to the accompanying drawings, forming a part thereof, in which similar letters of reference indicate corresponding parts.

This invention relates to locks for bicycles and similar vehicles; and the object thereof is to provide a lock for vehicles of this class which is adapted to be connected with a part of the frame thereof and to operate in connection with the tire of one of the wheels; and with this and other objects in view the invention consists in the construction, combination, and arrangement of parts hereinafter described and claimed.

The invention is fully disclosed in the following specification, of which the accompanying drawings form a part, in which—

Figure 1 is a side view of the forward part of the frame of a bicycle and a portion of the drive-wheel and showing my lock secured in position; Fig. 2, a side view of the lock with one side of the casing removed; Fig. 3, a longitudinal section thereof, and Fig. 4 a front view of the construction shown in Fig. 1.

In the drawings forming part of this specification, A represents the tire of the guide-wheel of a bicycle; $a$, the forward fork of the frame, in which the guide-wheel is mounted, and $a^2$ the cross-head of said fork, the latter being best shown in Fig. 4; and in the practice of my invention I provide a lock which comprises a casing B, the back of which is provided with a yoke $b$, by which the casing is secured to the cross-head $a^2$ of the forward fork of the frame.

The sides of the yoke $b$ are passed through the back of the casing B and secured thereto by a nut $b^2$, as shown in Figs. 2 and 3, and mounted within the casing at one side thereof is a vertically-movable bar D, the ends of which extend through the ends of the casing, and the lower end of which is provided with a brake-shoe and the upper end with a head $d^2$, and between the head $d^2$ and the casing is a spring $d^3$.

The inner side of the bar D is provided with ratchet-teeth $d^4$, and pivotally supported within the casing is a pawl-lever G, one end of which operates in connection with said notches or recesses, and the upper end of which is adapted to be operated by a key-cylinder H, provided with arms $h$ and $h^2$, and adjacent to said pawl-lever is a spring L, which operates in connection therewith and which is adapted to force the lower end thereof into connection with the ratchet-teeth $d^4$.

The key-cylinder H is operated by a key inserted thereinto through the side of the casing at $h^3$, and the operation of this device will be readily understood from the foregoing description when taken in connection with the accompanying drawings.

In order to lock the machine, it is only necessary to depress the rod D, which is done by pressing firmly upon the head $d^2$ thereof, and the pawl-lever G will always operate to hold said rod in the depressed position, and whenever it is desired to unlock the wheel the key is inserted and the tumbler revolved, and this operation will press the upper end of the pawl-lever in the direction of the rod D and release the lower end thereof from the ratchet-teeth $d^4$, when the rod will be raised by the spring $d^2$.

The outer side M of the box or casing is removable and it is held in place by a spring-operated vertically-movable rod $m$, which is mounted in keepers secured to the inner side thereof, and between two of which is mounted a spring $m^2$, and the rod $m$ is also provided with an inwardly-directed arm, as $m^3$, which is adapted to be operated by the arm $b^2$ of the key-cylinder H, and the upper end of the rod $m$ is provided with a head or projection $m^4$, which is adapted to operate in connection with a depending flange or plate O on the end of the box or casing, and said removable side M may be removed at any time by turning the key-cylinder H with the key until the arm $h^2$ thereof strikes the arm $m^3$ of the rod $m$ and depresses said rod, so as to free the head or projection $m^4$ from the flange or plate O.

This device is simple in construction and operation and also comparatively inexpensive, and it is evident that the same may be connected with the rear portion of the frame of the vehicle and operate in connection with the drive-wheel instead of being connected with the frame, so as to operate in connection with the guide-wheel, as herein described, and it is evident that changes in and modifications of the construction thereof may be made without departing from the spirit of my invention or sacrificing its advantages, and I reserve the right to make all such alterations therein as fairly come within the scope of the invention.

Having fully described my invention, I claim as new and desire to secure by Letters Patent—

The combination with the frame of a bicycle or similar device having wheels therein, of a lock which consists of an oblong-shaped box or casing secured to the said frame, adjacent to one of the said wheels; a vertically-movable bar passing through said casing having on its lower end a shoe, said shoe being adapted to engage said wheel, teeth on said bar, a spring-actuated lever engaging said teeth, a key-cylinder having two arms thereon one of which engages said lever, said casing being provided near said key-cylinder with an opening, a removable side to said casing having on its inner face keepers, a rod mounted in said keepers, a spring on said rod and between said keepers, an inwardly-directed arm secured to said rod and adapted to engage the remaining one of the said key-cylinder arms, a flange on the end of said casing and a head on the upper end of said rod adapted to engage said flange, substantially as and for the purposes set forth and described.

In testimony that I claim the foregoing as my invention I have signed my name, in presence of the subscribing witnesses, this 13th day of February, 1896.

EDWARD H. B. BROW.

Witnesses:
JESSE BLAISDELL,
EDMUND ELTING VANDER BURGH.